United States Patent
Guest

(10) Patent No.: US 9,908,379 B2
(45) Date of Patent: Mar. 6, 2018

(54) CONTROL SYSTEM FOR A VEHICLE SUSPENSION

(71) Applicant: Jaguar Land Rover Limited, Whitley Coventry, Warwickshire (GB)

(72) Inventor: Philip Guest, Warwick (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 100 days.

(21) Appl. No.: 14/776,369

(22) PCT Filed: Jan. 14, 2014

(86) PCT No.: PCT/EP2014/050557
§ 371 (c)(1),
(2) Date: Sep. 14, 2015

(87) PCT Pub. No.: WO2014/139700
PCT Pub. Date: Sep. 18, 2014

(65) Prior Publication Data
US 2016/0023530 A1 Jan. 28, 2016

(30) Foreign Application Priority Data
Mar. 14, 2013 (GB) .................................. 1304655.2

(51) Int. Cl.
*B60G 17/016* (2006.01)
*B62C 3/00* (2006.01)
(Continued)

(52) U.S. Cl.
CPC ......... *B60G 17/016* (2013.01); *B60G 17/017* (2013.01); *B60G 17/019* (2013.01);
(Continued)

(58) Field of Classification Search
None
See application file for complete search history.

(56) References Cited

U.S. PATENT DOCUMENTS 4,630,840 A * 12/1986 Masuda ............... B60G 17/017
180/41
4,718,695 A * 1/1988 Kawagoe ........... B60G 17/0185
280/5.501

(Continued)

FOREIGN PATENT DOCUMENTS

EP 0900152 A1 3/1999
GB 2292916 A 3/1996

(Continued)

OTHER PUBLICATIONS

International Search Report for application No. PCT/EP2014/050557, dated Mar. 27, 2014, 3 pages.

(Continued)

*Primary Examiner* — Bhavesh V Amin
(74) *Attorney, Agent, or Firm* — Reising Ethington P.C.

(57) ABSTRACT

The present application relates to a control system (49) for controlling a motor vehicle suspension (3). The suspension (3) has a plurality of adjustable height suspension units (19, 21, 23, 25) and a suspension control means (53) is provided to control the suspension units (19, 21, 23, 25). The control system (49) has a receiver for receiving height data form height sensors (41, 43, 45, 47) to provide height measurements for each suspension unit (19, 21, 23, 25). A suspension modelling means is provided for modelling the height of each suspension unit (19, 21, 23, 25). The control system (49) is configured to detect an unrequested suspension height change when the difference between the modelled height and the measured height of one or more suspension units (19, 21, 23, 25) exceeds a threshold. The present application also relates to a motor vehicle; and a method of detecting an unrequested suspension height change.

21 Claims, 5 Drawing Sheets

(51) Int. Cl.
  *G06F 7/00* (2006.01)
  *B60G 17/0165* (2006.01)
  *B60G 17/017* (2006.01)
  *B60G 17/019* (2006.01)

(52) U.S. Cl.
  CPC ...... *B60G 17/0165* (2013.01); *B60G 2300/07* (2013.01); *B60G 2400/252* (2013.01)

(56) References Cited

U.S. PATENT DOCUMENTS

| | | | | |
|---|---|---|---|---|
| 4,741,554 A * | 5/1988 | Okamoto | ........... | B60G 17/0164 280/5.513 |
| 4,783,089 A * | 11/1988 | Hamilton | ........... | B60G 17/0155 280/5.514 |
| 4,789,935 A * | 12/1988 | Buma | ................ | B60G 17/0165 280/5.507 |
| 4,828,283 A * | 5/1989 | Ishii | ................... | B60G 17/0523 180/415 |
| 4,829,436 A * | 5/1989 | Kowalik | ............. | B60G 17/017 280/5.508 |
| 4,903,209 A * | 2/1990 | Kaneko | ................ | B60G 17/017 280/5.514 |
| 4,939,655 A * | 7/1990 | Majeed | ................ | B60G 17/017 280/5.504 |
| 4,948,166 A * | 8/1990 | Kaneko | ................ | B60G 17/016 180/41 |
| 5,047,938 A * | 9/1991 | Yokote | ................ | B60G 17/018 280/5.514 |
| 5,058,017 A * | 10/1991 | Adachi | ................ | B60G 17/016 280/5.507 |
| 5,135,065 A * | 8/1992 | Kawasaki | ........... | B60G 17/017 180/41 |
| 5,159,555 A * | 10/1992 | Wada | ................ | B60G 17/0182 280/5.503 |
| 5,364,122 A * | 11/1994 | Ichimaru | ............. | B60G 17/016 280/5.514 |
| 5,396,423 A * | 3/1995 | Fujimura | ........... | B60G 17/0162 280/5.508 |
| 5,430,647 A * | 7/1995 | Raad | ................... | B60G 17/016 180/41 |
| 5,430,648 A * | 7/1995 | Sasaki | .................... | B60G 17/08 180/41 |
| 5,435,729 A * | 7/1995 | Hildreth | ................... | G05G 5/03 434/365 |
| 5,452,919 A * | 9/1995 | Hoyle | ................ | B60G 17/0155 280/5.505 |
| 5,510,986 A * | 4/1996 | Williams | ............. | B60G 17/016 701/38 |
| 5,586,032 A * | 12/1996 | Kallenbach | .......... | B60G 17/018 180/197 |
| 5,696,678 A * | 12/1997 | Raad | ................... | B60G 17/0155 280/5.514 |
| 6,015,155 A * | 1/2000 | Brookes | ............. | B60G 17/0185 280/5.504 |
| 6,168,171 B1 * | 1/2001 | Shono | ................ | B60G 17/005 280/5.507 |
| 6,394,238 B1 * | 5/2002 | Rogala | ................ | B60G 13/14 188/266.2 |
| 6,556,908 B1 * | 4/2003 | Lu | ..................... | B60G 17/0185 180/271 |
| 6,581,948 B2 * | 6/2003 | Fox | ........................ | B62K 25/04 188/275 |
| 6,631,317 B2 * | 10/2003 | Lu | ........................ | B60G 17/016 340/440 |
| 6,684,140 B2 * | 1/2004 | Lu | ........................ | B60G 17/016 701/37 |
| 6,961,648 B2 * | 11/2005 | Salib | .................. | B60G 17/0162 280/5.502 |
| 7,063,333 B2 * | 6/2006 | van Cayzeele | .... | B60G 17/0161 180/179 |
| 7,104,547 B2 * | 9/2006 | Brookes | ............. | B60G 17/0155 280/5.507 |
| 7,132,937 B2 * | 11/2006 | Lu | ...................... | B60G 17/0162 340/438 |
| 7,239,949 B2 * | 7/2007 | Lu | ........................ | B60G 17/018 280/5.502 |
| 7,421,954 B2 * | 9/2008 | Bose | .................. | B60G 17/0162 105/209 |
| 8,155,835 B2 * | 4/2012 | Holbrook | ........... | B60G 17/0521 280/6.151 |
| 8,374,748 B2 * | 2/2013 | Jolly | ..................... | B60G 17/015 180/197 |
| 8,684,366 B2 * | 4/2014 | Murakami | ........... | B60G 17/021 280/5.514 |
| 8,702,109 B2 * | 4/2014 | Ryan | .................... | B60G 17/021 280/5.514 |
| 2002/0002431 A1 * | 1/2002 | Panizzolo | ................. | B60G 9/02 701/37 |
| 2004/0026880 A1 * | 2/2004 | Bundy | ............... | A01B 63/1006 280/6.159 |
| 2004/0153227 A1 * | 8/2004 | Hagiwara | .......... | B60G 17/0182 701/40 |
| 2005/0161891 A1 * | 7/2005 | Trudeau | ............. | B60G 17/0155 280/5.507 |
| 2006/0293817 A1 * | 12/2006 | Hagiwara | .......... | B60G 17/0152 701/40 |
| 2007/0114091 A1 * | 5/2007 | Biallas | ................ | F16H 61/0213 180/338 |
| 2008/0133066 A1 * | 6/2008 | Takenaka | ........... | B60G 17/0195 701/1 |
| 2009/0088918 A1 * | 4/2009 | Takenaka | ........... | B60T 8/17551 701/31.4 |
| 2010/0063689 A1 * | 3/2010 | Hein | .................. | B60G 17/0155 701/49 |
| 2010/0207344 A1 * | 8/2010 | Nakamura | ............. | B60G 13/16 280/124.108 |
| 2011/0035105 A1 * | 2/2011 | Jolly | ..................... | B60G 17/015 701/37 |
| 2014/0095023 A1 * | 4/2014 | Myggen | ............... | B60G 17/016 701/37 |
| 2015/0224845 A1 * | 8/2015 | Anderson | ............ | B60G 17/019 701/37 |

FOREIGN PATENT DOCUMENTS

| | | |
|---|---|---|
| GB | 2327922 A | 2/1999 |
| GB | 2402106 A | 12/2004 |
| GB | 2494415 A | 3/2013 |
| WO | 9745280 A1 | 12/1997 |

OTHER PUBLICATIONS

GB Combined Search and Examination Report for corresponding application No. GB1304655.2, dated Jul. 18, 2013, 5 pages.
Written Opinion for application No. PCT/EP2014/050557, dated Mar. 27, 2014, 5 pages.

* cited by examiner

CONTROL SYSTEM FOR A VEHICLE SUSPENSION

TECHNICAL FIELD

The present invention relates to a control system for controlling a motor vehicle suspension system; a suspension system; a motor vehicle; and a method of detecting an unrequested suspension height change.

BACKGROUND OF THE INVENTION

It is known to provide vehicle suspension systems with adjustable suspension units. A suspension controller can control the height of the suspension units to provide a self-levelling function whereby the height of each suspension unit is maintained at a target height. The suspension control unit will typically seek to increase the suspension height if it is lower than the target height; and decrease the suspension height if it is higher than the target height.

A suspension system for a motor vehicle is known from EP 0900152 to make vehicle hang-ups less likely. The suspension system is operative to adjust the ride height between sprung and unsprung parts of the vehicle. A height sensor is provided for air springs within the suspension to measure height changes. An electronic control unit maintains the ride height at each air spring within predetermined limits. The electronic control unit inhibits ride height changes when the vehicle is stationary to avoid height changes to compensate for loading/unloading or vehicle maintenance.

A bimodal suspension for an amphibious vehicle is known from GB 2402106. The wheels of the vehicle are raised when a wheel height detector detects wheel droop. As a safety check, a sensor detects that the vehicle is in water.

At least in certain embodiments the present invention sets out to overcome or ameliorate shortcomings associated with prior art suspension systems.

SUMMARY OF THE INVENTION

Aspects of the present invention relate to a control system for controlling a motor vehicle suspension system; a suspension system; a motor vehicle; and a method of detecting an unrequested suspension height change.

According to a further aspect of the present invention there is provided a control system for a motor vehicle suspension having a plurality of suspension units, the control system comprising:
 a receiver for receiving a measured height signal for each suspension unit; and
 a suspension modelling means for modelling the height of each suspension unit;
 wherein the control system is configured to detect an unrequested suspension height change when the difference between the modelled height and the measured height of one or more suspension units exceeds a first threshold.

In one arrangement said plurality of suspension units comprises a plurality of adjustable height suspension units, the control system further comprises a suspension control means for controlling the suspension units.

A discrepancy between the modelled and measured heights can signal an unrequested suspension height change (i.e. a change in the suspension height which is not in response to a height change signal from the suspension control means). The unrequested suspension height change can, for example, indicate that the vehicle body has been lifted. This can occur when the vehicle is wading since the inherent buoyancy will tend to lift the body, thereby increasing the suspension height. (This is particularly notable in vehicles having reduced mass, for example vehicles having an aluminium body and/or chassis.) Alternatively, the unrequested suspension height change can indicate that the vehicle body is partially or completely supported by the ground under the vehicle (referred to herein as a vehicle belly out event). The first threshold can be the same or different to detect vehicle wading and vehicle belly out events. The control system can be configured to output respective control signals, such as a wading detected signal or a belly out signal. The control signal can be used to control on-board systems, for example to control the suspension means unit to inhibit suspension height changes; and/or to control an engine control system to inhibit eco start/stops.

The suspension control means can be selectively operable to control said suspension units in a self-levelling mode. The inventors have recognised that operating the vehicle suspension system in a self-levelling mode is not desirable in all situations. When the self-levelling mode is active, the suspension control means will tend to respond to an unrequested increase in the suspension height by reducing the suspension height (for example reducing the fluid pressure in the suspension unit). However, this may reduce the ultimate wading depth capability of the vehicle; and/or reduce the reaction forces between the tyres and the ground, thereby reducing traction. Thus, if the unrequested suspension height change is a result of the vehicle wading, the operation of the suspension control means in said self-levelling mode may be undesirable. The control system can be configured to inhibit said self-levelling mode when said unrequested suspension height change is detected for at least one, two, three or four of said suspension units. The self-levelling mode can automatically be inhibited when the vehicle is wading. The control system can thereby help to reduce or avoid unnecessary and/or unwanted changes in suspension height.

The control system can be configured to inhibit said self-levelling mode for each suspension unit. Alternatively, the control system can be configured to inhibit said self-levelling mode only for the suspension unit(s) at which the unrequested suspension height change is detected. The control system can be configured to enable the self-levelling mode when the difference between the modelled height and the measured height decreases below a second threshold for at least one, two, three or four of said suspension units.

The unrequested change in the suspension height can be positive or negative. By monitoring any deviation between the modelled and measured heights of said one or more suspension units and comparing the deviation against the first threshold, the control system can identify a potential wading event or a belly out event. The control system can be configured to output a wading detected signal when said unrequested suspension height change is detected.

The control system can detect a wading event irrespective of the substance through which the vehicle is wading. The control system according to aspects of the present invention can operate when the vehicle is wading through a liquid, such as water; or through loose or deformable terrain, such as snow, sand, mud and the like. When wading through water, the inherent buoyancy of the vehicle body can cause it to lift in relation to the wheels. When wading through loose or deformable terrain, the wheel penetration may exceed vehicle ground clearance resulting in the underside of the vehicle (referred to as the vehicle belly) coming partially or fully into contact with the terrain surface (referred to as grounding) and in certain instances may cause the vehicle body to be partially or completely lifted (referred to herein as a vehicle belly out event).

Moreover, the detection of said unrequested suspension height change can be indicative of other body lift events. For example, when the vehicle is travelling along a track or road having wheel ruts, the wheels can be displaced laterally (either inwardly or outwardly) causing the vehicle body to rise/fall due to independent suspension geometry effects.

The first threshold defined by the control system can be modified to differentiate between body lift events, such as wading and belly out events. For example, the first threshold will be higher to detect a vehicle belly out event than to detect a vehicle wading event.

The difference between the modelled and measured heights at each suspension unit can provide an indication of the depth of the liquid or material through which the vehicle is wading. The control system could, for example, estimate the depth of the liquid or material at each suspension unit. This information can be output to the driver and/or used to control one or more vehicle control parameters. The control system could utilise additional parameters, such as vehicle speed; water flow rate; and vehicle load condition to estimate the depth of the liquid.

The control system can be configured to detect a vehicle belly out event based on detection of said unrequested suspension height change. The control system can utilise wheel traction data in combination with detection of the unrequested suspension height change to detect the vehicle belly out event. The control system can, for example, be configured to receive traction information for a driven wheel associated with one or more of said suspension units. The traction information can comprise wheel slip data, for example from a traction control system. The control system can be configured to detect a belly out event when an unrequested suspension height change is detected at one or more suspension units in combination with a loss of traction at the wheel(s) associated with said one or more suspension units. The control system can utilise vehicle speed data to detect the vehicle belly out event. The control system can, for example, detect a vehicle belly out event when the vehicle speed is below a minimum threshold or is zero. The control system can be configured to output a vehicle belly out signal. The suspension control means can be configured to increase the height of one or more of said suspension units in response to detection of said vehicle belly out event.

The suspension units can each comprise a height sensor for measuring the height of that suspension unit. The height sensors can each output height data which is received by the receiver.

The suspension modelling means can generate a virtual dynamic model of the vehicle suspension to model the height of each said suspension unit. The suspension modelling means can be implemented as part of the control system or as a discrete module. The suspension modelling means can be configured to model the height of each said suspension unit in dependence on data relating to one or more of the following: longitudinal vehicle acceleration; lateral vehicle acceleration; vertical vehicle acceleration; vehicle pitch; vehicle roll; vehicle speed; height measurement data; wheel drive torque(s); and wheel braking torque(s). The acceleration data can be received from one or more on-board accelerometers. The suspension modelling means can also use height measurement data for one or more of said suspension units. For example, a height of a first suspension unit can be modelled with reference to height measurement data derived from one of more of the other suspension units. Alternatively, or in addition, the suspension modelling means can model the height of each suspension unit based on one or more of the following: fluid pressure in the suspension unit; compression rates of the suspension unit; and return rates of the suspension unit.

The control system can be configured to detect the unrequested suspension height change over a period of time. The control system can detect a deviation (or variance) between the measured and modelled suspension heights over said period of time. A variation between the statistical mean modelled and measured suspension heights over said period of time could, for example, correspond to said unrequested suspension height change. The control system can be configured to calculate an offset (or deviation) between the modelled height of each suspension unit and a measured height of each said suspension unit (this offset can be referred to as a "height error"). The control system can calculate the offset at least substantially in real time.

The control system can be configured to pass either the calculated offset for each said suspension unit; or the modelled height of each suspension unit through a first filter to calculate a first running (moving) average over a first time period. The control system can also be configured to pass the calculated offset of each suspension unit through a second filter to calculate a second running (moving) average over a second time period. The first time period can be longer than the second time period. Thus, the first filter can be a slow filter and the second filter can be a fast filter.

The control system can calculate the difference based on the first and second running averages for each said suspension unit. The control system can detect an unrequested suspension height change when the calculated difference for at least one, two, three or four of said suspension units is greater than or equal to the first threshold. The control system can be configured to detect said unrequested suspension height change only when said offset is greater than or equal to the first threshold for a first time period (for example 1 second, 2 seconds or 5 seconds).

The first threshold can be indicative of an unrequested suspension height change which is indicative of vehicle wading and/or vehicle belly out events. The first threshold can be determined based on empirical or theoretical data. The first threshold could be fixed. Alternatively, the first threshold could be variable. The first threshold could, for example, be based on vehicle loading or a calculated confidence in the accuracy of the suspension model. The first threshold could be increased if the confidence in the suspension model decreases.

The control system can determine that the unrequested suspension height change has ended (for example indicating that the vehicle is no longer wading or that the vehicle has recovered from a belly out event) when the calculated difference is less than or equal to a second threshold. When the calculated difference becomes equal to or greater than the first threshold, the control system can freeze or store the first running average as a reference value for each said suspension unit. The control system can determine that the unrequested suspension height change has ended when the calculated difference between the second running average and the stored reference value for at least one, two, three or four of said suspension units is less than or equal to a second threshold. The control system can be configured to output a wading undetected signal. The second threshold can be the same as the first threshold, or can be less than the first threshold. The control system can be configured to determine that the unrequested suspension height change has ended only when said calculated difference is less than or equal to the second threshold for a second time period (for example 1 second, 2 seconds or 5 seconds). The second time period can be different to the first time period. The first time period (for detection) can be less than the second time period (for undetection).

The control system can determine that the unrequested suspension height change has ended when the vehicle has traveled a predefined first distance (for example 50m, 100, or 200 m) with the calculated difference less than or equal to the second threshold. Alternatively, or in addition, the control system can be configured to determine that the unrequested suspension height change has ended when the vehicle has traveled a predefined second distance following the initial detection (for example, a distance traveled of 300 m). Thus, the control system can be configured to inhibit the self-levelling mode only while the vehicle travels said predefined second distance.

The control system can monitor vehicle speed as a further check to determine whether the unrequested suspension height change is indicative of the vehicle wading. The control system can determine that the vehicle is not wading if the vehicle speed is above a predefined wading threshold. This comparison can be performed to determine that the vehicle is no longer wading.

The control means can be in communication with a traction control system to determine when traction is no longer available. The loss of traction can, for example, indicate that the vehicle wheels have been lifted, for example due to the buoyancy of the vehicle body or the underside of the vehicle being partially or completely grounded. If the traction control system determines that traction has been lost, the suspension control means can be configured to increase the height of one or more of said suspension units. The suspension control means can be configured to increase the height of the suspension unit where a loss of traction has been detected and/or a suspension unit disposed opposite to the suspension unit where the loss of traction has been detected (to pivot the vehicle body to improve traction). The control system can thereby be configured to provide progressive responses to wading detection. The control system can initially operate to inhibit the self-levelling mode to prevent unwanted reduction in suspension height; followed by an increase in the suspension height if traction is lost.

The control system could be configured to inhibit other systems in response to detection of an unrequested suspension height change in height. For example, the control system could inhibit automatic engine eco stops (automatic stop/start techniques) as these could allow water to flow into the exhaust(s), potentially damaging the catalysts.

The suspension control means can actively control the height of the suspension units to adjust a ride height between sprung and unsprung parts of the vehicle. When operating in said self-levelling mode, the suspension control means can output height change signals to control the height of each suspension unit at a target height or within a target height range. The suspension control means can output height change signals to increase the suspension height when the suspension height is below a target height; and to decrease the suspension height when the suspension height is above a target height. The vehicle ride height can thereby be maintained at a target ride height. The control system can be configured to modify a target suspension height, for example in dependence on detection of a wading event or a belly out event.

According to a further aspect of the present invention there is provided a control system for a motor vehicle suspension having a plurality of adjustable height suspension units, the control system comprising:
 suspension control means selectively operable to control the suspension units in a self-levelling mode; and
 a receiver for receiving a wading signal from a wading sensor or a drive mode selector;
 wherein the control system is configured to inhibit said self-levelling mode when the wading signal indicates that the vehicle is wading.

The wading signal can provide a positive indication that the vehicle is wading. The receiver could be configured to receive a signal from one or more sensors to indicate that the vehicle is wading. For example, the one or more sensors can output a wading detected signal. The sensor(s) could, for example, detect the presence/absence of a liquid; or a loose or deformable terrain. The parking distance sensors could be configured to determine that the vehicle is wading through water; or one or more dedicated water sensors could be provided. Alternatively, the one or more sensors could measure the surface height of a liquid or terrain relative to the vehicle body.

The drive mode selector could be implemented automatically, for example using the techniques described herein to detect an unrequested suspension height change; or could be operated manually, for example a driver operated selector. The control means can also inhibit automatic eco starts when the drive mode selector is in said wading drive mode.

According to a further aspect of the present invention there is provided a control system for detecting when a motor vehicle is wading, the control system comprising:
 a suspension controller operable to control a plurality of adjustable height suspension units in a self-levelling mode;
 a receiver for receiving a measured height signal for each suspension unit; and
 a suspension modelling module for modelling the height of each suspension unit;
 the control system being configured to detect an unrequested suspension height change indicative of vehicle wading when the difference between the modelled height and the measured height of one or more suspension units exceeds a wading detection threshold; the control system being configured to inhibit said self-levelling mode when said unrequested suspension height change is detected for at least one, two, three or four of said suspension units.

According to a still further aspect of the present invention there is provided a control system for detecting a vehicle belly out event, the control system comprising:
 a suspension controller for controlling a plurality of adjustable height suspension units;
 a receiver for receiving a measured height signal for each suspension unit and traction information for a driven wheel associated with each suspension unit; and
 a suspension modelling module for modelling the height of each suspension unit;
 the control system being configured to detect an unrequested suspension height change indicative of a belly out event when the difference between the modelled height and the measured height of one or more suspension units exceeds a belly out detection threshold;
 wherein, in dependence on the detection of said unrequested suspension height change at a suspension unit in combination with a detected reduction in traction at the driven wheel associated with that suspension unit, the suspension controller is configured to increase the height of said suspension unit.

According to a yet further aspect of the present invention there is provided a control system for a motor vehicle suspension having a plurality of suspension units, the control system comprising:
- a receiver for receiving a measured height signal for each suspension unit; and
- a suspension modelling module for modelling the height of each suspension unit;
- wherein the control system is configured to detect an unrequested suspension height change when the difference between the modelled height and the measured height of one or more suspension units exceeds a first threshold.

According to a further aspect of the present invention there is provided a suspension system incorporating a control system as described herein. According to a still further aspect of the present invention there is provided a motor vehicle incorporating a control system as described herein.

According to a yet further aspect of the present invention there is provided a method of detecting an unrequested suspension height change, the method comprising:
- measuring the height of a vehicle suspension unit;
- modelling the height of said vehicle suspension unit; and
- calculating a difference between the modelled height and the measured height of said vehicle suspension unit; and
- identifying an unrequested suspension height change when the calculated difference exceeds a first threshold.

The unrequested suspension height change can correspond to a vehicle wading event or a vehicle belly out event. The method could comprise inhibiting requested height adjustments of the vehicle suspension unit. The method could comprise controlling a suspension control means to inhibit self-levelling of the suspension unit when the unrequested suspension height change is identified. The method can be computer-implemented. The method can be performed for a plurality of suspension units making up a vehicle suspension system.

The control system described herein can comprise a control unit or computational device having one or more electronic processors. The system may comprise a single control unit or electronic controller or alternatively different functions of the control system may be embodied in, or hosted in, different control units or controllers. As used herein the term "control unit" will be understood to include both a single control unit or controller and a plurality of control units or controllers collectively operating to provide the stated control functionality. A set of instructions could be provided which, when executed, cause said computational device to implement the control techniques described herein. The set of instructions could be embedded in said one or more electronic processors. Alternatively, the set of instructions could be provided as software to be executed on said computational device.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

An embodiment of the present invention will now be described, by way of example only, with reference to the accompanying figures, in which.

DETAILED DESCRIPTION OF AN EMBODIMENT

Figure 1:
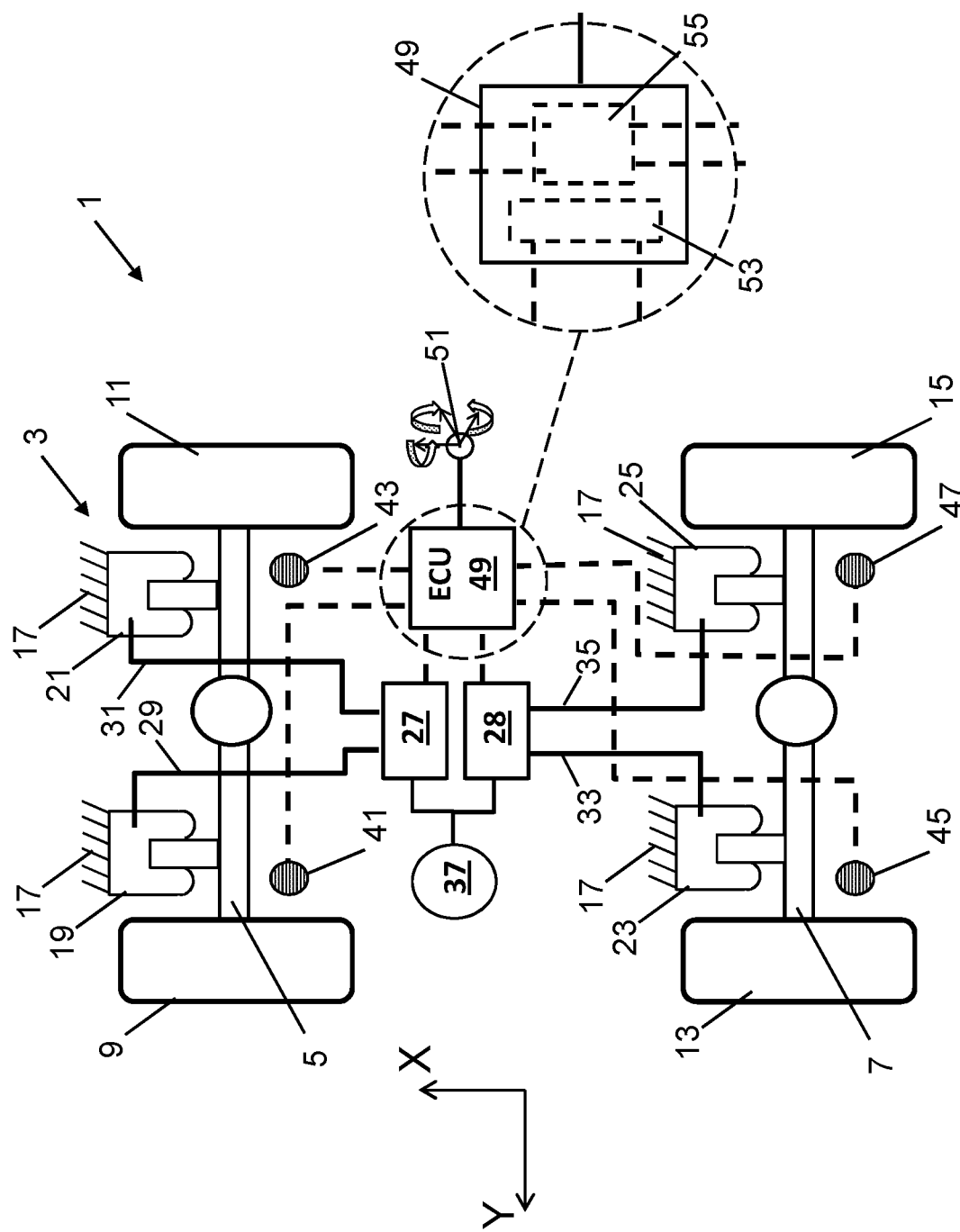
FIG. 1 shows a schematic representation of a motor vehicle suspension in accordance with an embodiment of the present invention.

A vehicle 1 having an adjustable height suspension 3 in accordance with the present invention is illustrated in FIG. 1. The vehicle 1 is a four-wheel drive vehicle capable of driving off-road.

The vehicle 1 has a front axle 5 and a rear axle 7, both representing unsprung parts of the vehicle 1. The front axle 5 carries front wheels 9, 11; and the rear axle 7 carries rear wheels 13, 15. A sprung part of the vehicle 1, represented diagrammatically as a body or chassis 17 (see FIG. 2), has its weight supported by front air spring suspension units 19, 21 and rear air spring suspension units 23, 25.

The air spring suspension units 19, 21, 23, 25 are connected to respective front and rear valve blocks 27, 28 through individual pipes 29, 31, 33, 35. The valve blocks 27, 28 are connected to a motor driven compressor 37 through a regenerative dryer. The valve blocks 27, 28 comprises a valve array (not shown) which can operatively connect each air spring suspension unit 19, 21, 23, 25 to the compressor 37 or to an exhaust to atmosphere 39; or can isolate each air spring suspension unit 19, 21, 23, 25 to maintain the mass of air therein constant. Thus, the valve blocks 27, 28 enable independent control of the air pressure in each of the air spring suspension units 19, 21, 23, 25.

The air spring suspension units 19, 21, 23, 25 have respective height sensors 41, 43, 45, 47 for measuring the height of each suspension unit 19, 21, 23, 25. Thus, the height sensors 41, 43, 45, 47 measure the height of the sprung components relative to the unsprung components. The height sensors 41, 43, 45, 47 can be a rotary Hall-effect transducer or a rotary potentiometer, for example. The height sensors 41, 43, 45, 47 are connected to an electronic control unit (ECU) 49 to provide height data. The ECU 49 can calculate the ride height of the body 17 (relative to the wheels 9, 11, 13, 15) based on the height data received from the height sensors 41, 43, 45, 47. A three-axis accelerometer 51 is also connected to the ECU 49. The accelerometer 51 measures acceleration in the X, Y and Z axis to provide longitudinal, lateral and vertical acceleration data for the vehicle body 17. The ECU 49 is also connected to a vehicle communication bus (not shown) to receive data relating to vehicle operating parameters, such as the vehicle speed derived from wheel velocity transducers. The ECU 49 can, for example, receive wheel spin data for each wheel 9, 11, 13, 15. The wheel spin data can be supplied by a traction control module (not shown) and can identify wheel spin at one or more of the wheels 9, 11, 13, 15 when traction is lost. The system may comprise a single control unit or electronic controller or alternatively different functions of the control system may be embodied in, or hosted in, different control units or controllers. As used herein the term "control unit", "electronic control unit" or "ECU" will be understood to include both a single control unit or controller and a plurality of control units or controllers collectively operating to provide the stated control functionality.

Figure 2A:
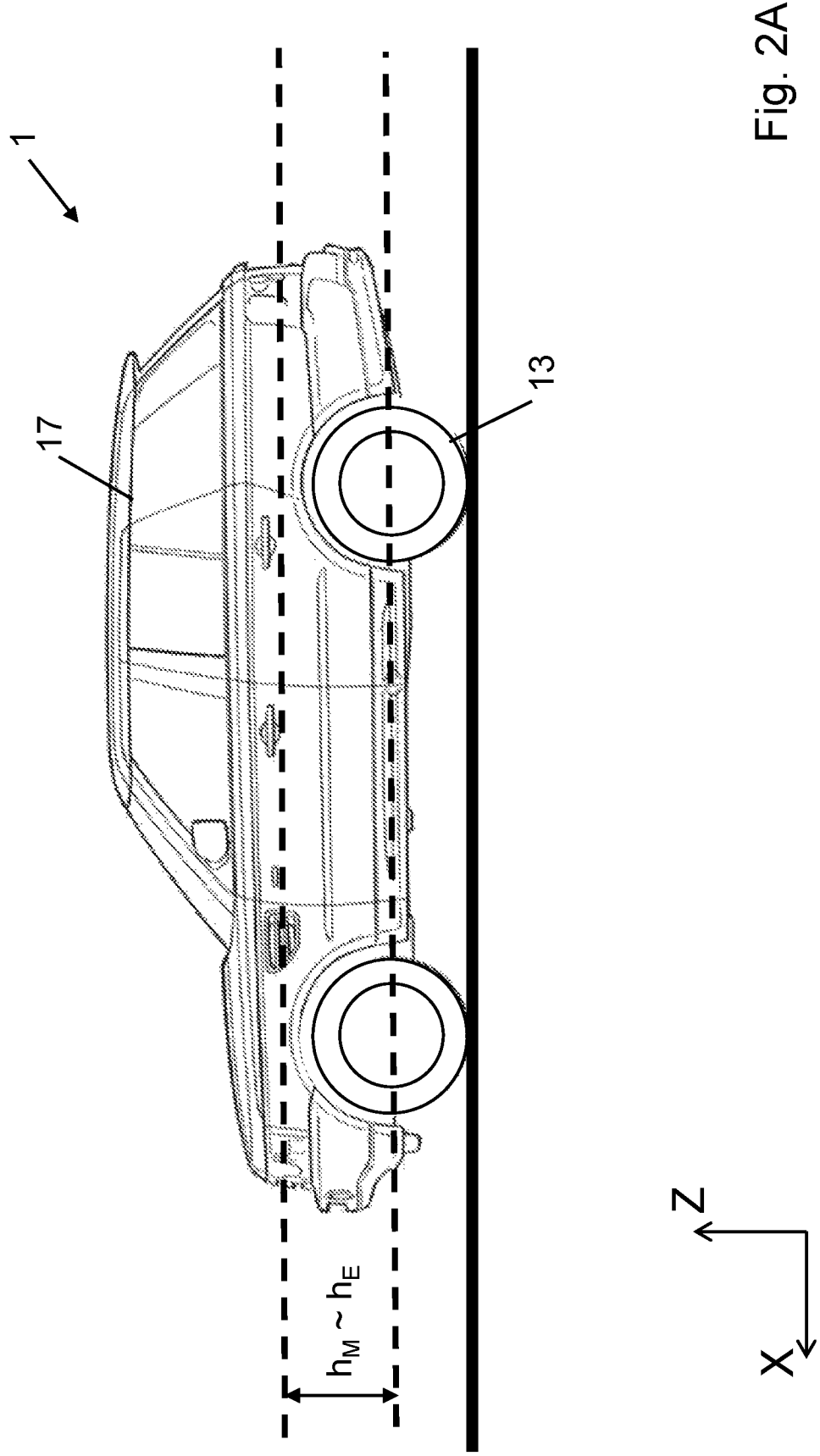
FIG. 2A shows a side elevation of the motor vehicle in a normal operating mode.

The ECU 49 comprises a suspension control means in the form of a suspension controller 53 to output height change signals to the valve blocks 27, 28. The suspension controller 53 can output height change signals independently to control the mass of air in each of the air spring suspension units 19, 21, 23, 25 to adjust the height of each air spring suspension units 19, 21, 23, 25. In normal use, the suspension controller 53 is configured to operate in a self-levelling mode to maintain the height of each air spring suspension unit 19, 21, 23, 25 at a control target height. This operating mode is illustrated in FIG. 2A when the vehicle 1 is on level ground. If the ECU 49 determines that the height of an air spring suspension unit 19, 21, 23, 25 is below the control target height, the suspension controller 53 outputs height change signals to the valve blocks 27, 28 to increase the air mass in that air spring suspension unit 19, 21, 23, 25 to increase the height of that suspension unit. Conversely, if the ECU 49 determines that the height of an air spring suspension unit 19, 21, 23, 25 is below the control target height, the suspension controller 53 outputs height change signals to the valve blocks 27, 28 to reduce the air mass in that air spring suspension unit 19, 21, 23, 25 to reduce its height. The suspension controller 53 operates to maintain the ride height of the body 17 at the control target height or within a predefined range.

Figure 2B:
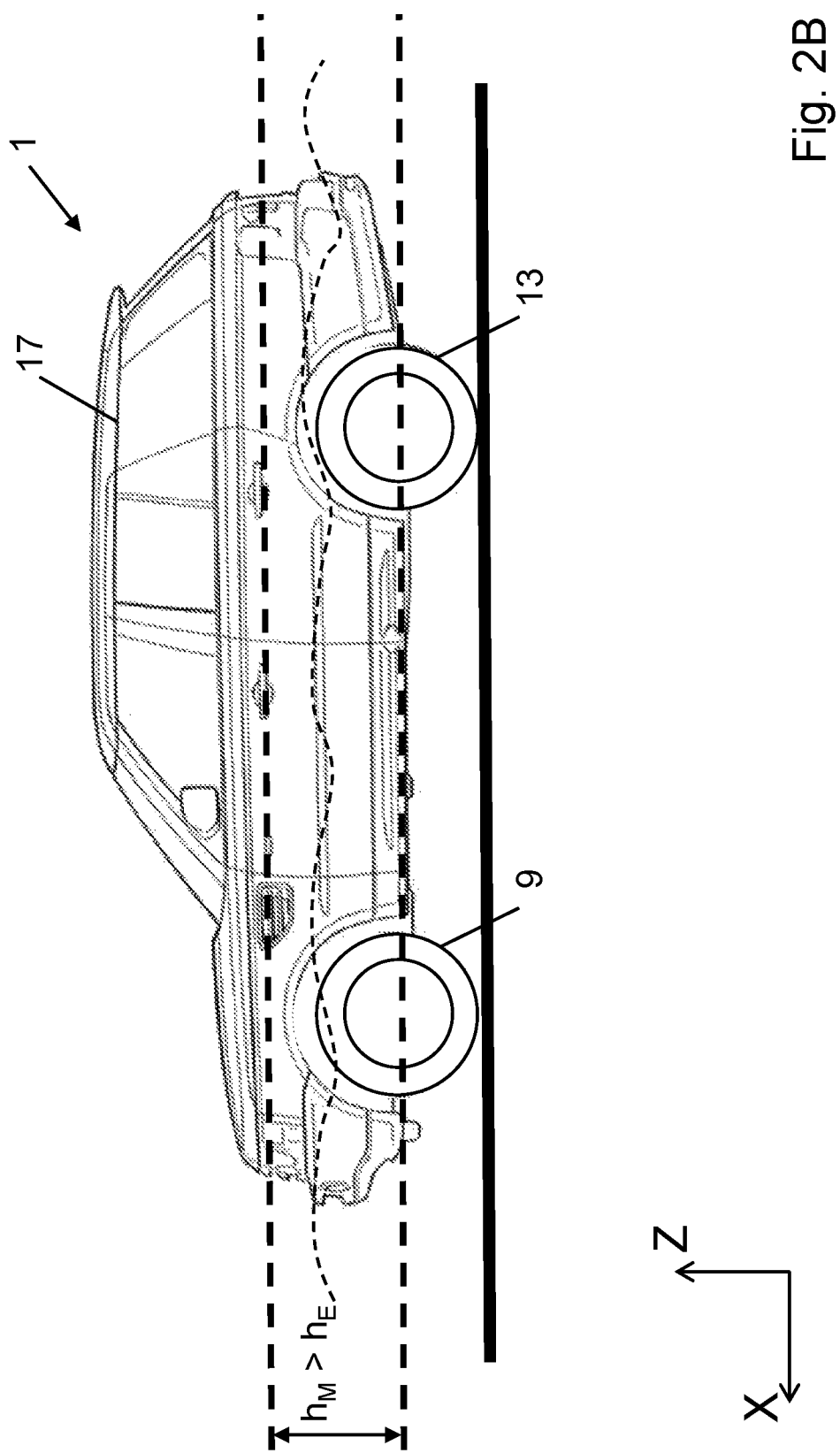
FIG. 2B shows a side elevation of the motor vehicle in a wading scenario.

The inventors have determined that it is not always desirable to operate the suspension controller 53 in said self-levelling mode. In particular, if the vehicle 1 is wading in deep water (for example having a depth of greater than 350-400 mm, depending on the vehicle and load), the natural buoyancy of the vehicle 1 will tend to lift the body 17, thereby increasing the suspension height, as illustrated in FIG. 2B. If the suspension controller 53 is operating in its self-levelling mode, the response is to reduce the mass of air in the affected air spring suspension units 19, 21, 23, 25 to lower the suspension height. However, this response is undesirable as it can reduce the ultimate wading depth capability of the vehicle 1; and/or can reduce the reaction forces between the tyres and the ground, thereby reducing traction. As described herein, the ECU 49 according to the present invention is configured to control the suspension controller 53 selectively to inhibit the self-levelling mode.

The ECU 49 comprises suspension modelling means in the form of a suspension modelling module 55 to estimate the expected height ($h_E$) of each suspension unit 19, 21, 23, 25. The suspension modelling module 55 can be computer-implemented, for example providing an instruction set for the ECU 49. The suspension modelling module 55 could implement a dynamic model ranging from a relatively simple linearised suspension displacement model through to a multibody kinematic suspension model. The linearised model takes inputs (such as surface flatness, lateral acceleration, longitudinal acceleration and vertical acceleration) for each corner of the suspension and multiplies these inputs by a set of gains; the products are summed to achieve a prediction of suspension displacement from nominal for that corner. The multibody kinematic model can be derived using proprietary packages, such as Adams (available from MSC Software Corporation, 2 MacArthur Place, Santa Ana, Calif. 92707) or Simpack (available from SIMPACK AG, Friedrichshafener Strasse 1, 82205 Gilching, Germany). The linearised model has the advantage of requiring very little computing resource, but will fail to predict non-linear suspension characteristics. Intermediate models having a complexity between the linearised model and the multibody kinematic model can use information from tables of non-linear suspension characteristics to provide good estimations of actual suspension behaviour.

The ECU 49 compares the estimated height ($h_E$) and the measured height ($h_M$) of each suspension unit 19, 21, 23, 25. If the difference between the estimated and measured heights exceeds a predefined threshold, the ECU 49 determines that an unrequested height change has occurred. The unrequested height change could, for example, indicate that the vehicle 1 is wading or that a belly out event has occurred.

Figure 3:
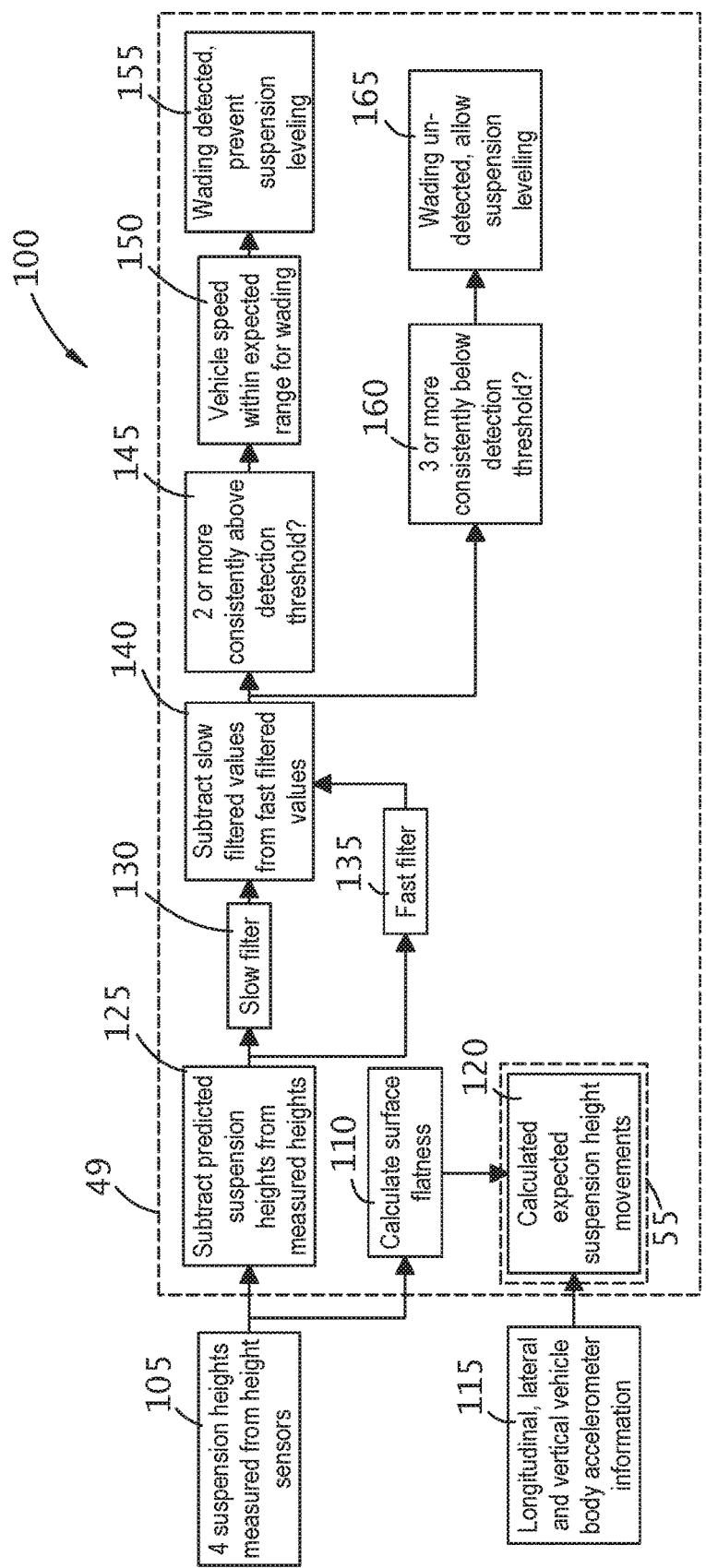
FIG. 3 shows a flow diagram illustrating the operation of an electronic control unit in accordance with the present invention to detect a wading event.

The operation of the ECU 49 to detect a wading event will now be described in more detail with reference to a first flow diagram 100 shown in FIG. 3. The height sensors 41, 43, 45, 47 measure the height of each suspension unit 19, 21, 23, 25 and height data ($h_M$) is output to the ECU 49 (STEP 105). The ECU 49 processes the height data to model the surface beneath the wheels 9, 11, 13, 15 (STEP 110), in particular to calculate the flatness of the surface. The accelerometer 51 measures longitudinal, lateral and vertical acceleration of the body 17 and outputs the acceleration data to the ECU 49 (STEP 115). The acceleration data enables the ECU 49 to determine whether the vehicle 1 is accelerating, braking, cornering, ascending/descending a gradient, or traversing a side slope. When combined with the modelled surface data derived from the height sensors 41, 43, 45, 47, the suspension modelling module 55 can estimate the height ($h_E$) of each suspension unit 19, 21, 23, 25 (STEP 120).

The ECU 49 is configured to calculate the difference between the estimated height and the measured height of each suspension unit 19, 21, 23, 25 (STEP 125). If the vehicle 1 is wading, the measured height ($h_M$) of the suspension units 19, 21, 23, 25 will be greater than the estimated height ($h_E$). The ECU 49 can detect when the vehicle 1 is wading by performing a comparison between the estimated height ($h_E$) and the measured height ($h_M$). The ECU 49 calculates the offset between the estimated and the measured heights at each suspension unit 19, 21, 23, 25 and the four values are passed through a first filter (STEP 130) and a second filter (STEP 135) to generate first and second filtered results. The first filter is a slow filter and the second filter is a fast filter. The results from the first filter provide a running (moving) average of the suspension height error from a target height and are subtracted from the results from the second filter (STEP 140). This calculation provides a measure of how much each suspension unit 19, 21, 23, 25 has lifted from its long term running average.

The ECU 49 checks to determine if two or more of said suspension units 19, 21, 23, 25 have lifted consistently above a first detection threshold (STEP 145), indicating an unrequested increase in the suspension height. If this unrequested height change is detected, the ECU 49 performs a further check to determine whether the vehicle speed is within an expected range for wading (STEP 150), for example above a minimum non-zero threshold and/or below a predefined wading threshold. If the ECU 49 determines that two or more of the suspension units 19, 21, 23, 25 have lifted beyond the first detection threshold and the vehicle speed is within the expected range, a wading detected signal is generated to indicate that the vehicle 1 is wading and the self-levelling mode is prevented from operating (STEP 155). The ECU 49 can require that the two or more suspension units 19, 21, 23, 25 have been lifted beyond the first detection threshold for a first time period, for example 1, 2 or 5 seconds. The ECU 49 can optionally also monitor the vehicle speed and inhibit the wading detected signal if the vehicle speed is above a predefined wading speed (for example 10 km/h).

The ECU 49 also performs a check to determine if three or more of said suspension units 19, 21, 23, 25 have dropped consistently below a second detection threshold (STEP 160). If this is detected, the ECU 49 determines that the vehicle 1 is no longer wading and enables the self-levelling mode (STEP 165). The ECU 49 can require that the two or more suspension units 19, 21, 23, 25 have dropped below the second detection threshold for a second time period, for example 1, 2 or 5 seconds. The ECU 49 can optionally also monitor the vehicle speed and determine that the vehicle is no longer wading if the vehicle speed is above a predefined wading speed (for example 10 km/h).

Figure 4:
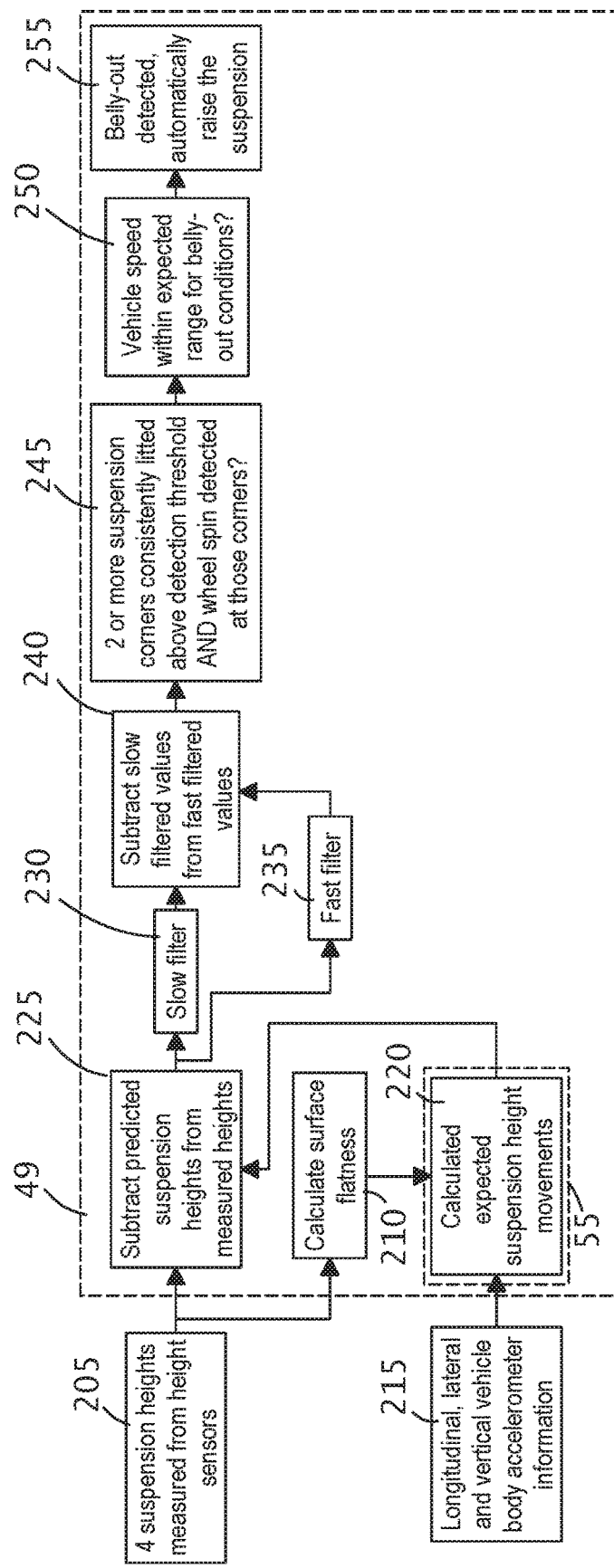
FIG. 4 shows a flow diagram illustrating the operation of an electronic control unit in accordance with the present invention to detect a belly out event.

The operation of the ECU 49 to detect a belly out event will now be described in more detail with reference to a second flow diagram 200 shown in FIG. 4. The height sensors 41, 43, 45, 47 measure the height of each suspension unit 19, 21, 23, 25 and height data ($h_M$) is output to the ECU 49 (STEP 205). The ECU 49 processes the height data to model the surface beneath the wheels 9, 11, 13, 15 (STEP 210), in particular to calculate the flatness of the surface. The accelerometer 51 measures longitudinal, lateral and vertical acceleration of the body 17 and outputs the acceleration data to the ECU 49 (STEP 215). The acceleration data enables the ECU 49 to determine whether the vehicle 1 is accelerating, braking, cornering, ascending/descending a gradient, or traversing a side slope. When combined with the modelled surface data derived from the height sensors 41, 43, 45, 47, the suspension modelling module 55 can estimate the height ($h_E$) of each suspension unit 19, 21, 23, 25 (STEP 220).

The ECU 49 is configured to calculate the difference between the estimated height and the measured height of each suspension unit 19, 21, 23, 25 (STEP 225). If a belly out event has occurred, the measured height ($h_M$) of the suspension units 19, 21, 23, 25 will be higher than the estimated height ($h_E$). The ECU 49 can thereby detect a belly out event by performing a comparison between the estimated height ($h_E$) and the measured height ($h_M$). The ECU 49 calculates the offset between the estimated and the measured heights at each suspension unit 19, 21, 23, 25 and the four values are passed through a first filter (STEP 230) and a second filter (STEP 235) to generate first and second filtered results. The first filter is a slow filter (i.e. operating over a relatively long time period) and the second filter is a fast filter (i.e. operating over a relatively short time period). The results from the first filter provide a running (moving) average of the suspension height error from a target height and are subtracted from the results from the second filter (STEP 240). This calculation provides a measure of how much each suspension unit 19, 21, 23, 25 has lifted from its long term running average.

The ECU 49 checks to determine if the height of said suspension units 19, 21, 23, 25 has increased above a third detection threshold, indicating an unrequested increase in the suspension height. The ECU 49 also checks whether wheel spin has been detected by the traction control unit at the wheel associated with each suspension units 19, 21, 23, 25 experiencing an unrequested increase in height (STEP 245). If an unrequested height change together with wheel spin is detected at two or more of said suspension units 19, 21, 23, 25, the ECU 49 performs a further check to determine whether the vehicle speed is below a minimum threshold (for example 10 km/h) defined for a belly-out event (STEP 250). If the ECU 49 determines that one of the suspension units 19, 21, 23, 25 has increased above the third detection threshold and the vehicle speed is below the minimum threshold, a belly out detected signal is generated to indicate that a belly out event has occurred and the suspension controller 53 outputs a height increase signal to increase the height of the suspension units 19, 21, 23, 25 (STEP 255). The suspension controller 53 can be configured to increase the height of all of the suspension units 19, 21, 23, 25 or only those units for which the unrequested height increase has been detected. The ECU 49 can optionally also be configured to inhibit the self-levelling mode (STEP 255). The ECU 49 can require that the suspension unit 19, 21, 23, 25 is above the third detection threshold for a third time period, for example 1, 2 or 5 seconds. The ECU 49 can inhibit the belly out detected signal if the vehicle speed is above the minimum threshold speed.

The ECU 49 has been described as detecting both wading and belly out events for the vehicle 1. The ECU 49 could be configured to implement one or both of the detection strategies described herein.

The invention has been described herein with reference to a comparison of modelled and measured suspension heights. Alternatively, or in addition, the control unit could monitor suspension compression/return rates to detect an unrequested height change. The control unit could measure fluid pressure within one or more of the suspension units, for example to determine the relative position of those suspension units. A reduction in the fluid pressure in said one or more suspension units can be detected during wading as the vehicle body is at least partially lifted. The measured fluid pressure could be compared with a modelled fluid pressure to determine when the vehicle is wading. The measured pressures can be compared with predicted pressures to help avoid false detections on uneven surfaces, side slopes, gradients or during acceleration, braking or cornering.

The present embodiment has been described with reference to a vehicle ride height and a suspension height. These heights are both defined in relation to respective reference points, which can be coincident with, or offset from each other. The suspension unit height can be the same as the vehicle ride height. Alternatively, the suspension controller 53 can map the vehicle ride height to a corresponding suspension height (or vice versa). For example, the suspension controller 53 can determine the required suspension height to achieve a target ride height. The suspension controller 53 can calculate the required suspension height or access a look-up table to identify the required suspension height to achieve the target ride height. The unrequested suspension height change corresponds to an unrequested ride height change.

It will be appreciated that various changes and modifications can be made to the embodiment described herein without departing from the present invention.

The invention claimed is:

1. A control system for a motor vehicle suspension having a plurality of adjustable height suspension units, the control system comprising:

a suspension controller for controlling the suspension units;

a receiver for receiving a measured height signal for each suspension unit; and a suspension modelling module for modelling the height of each suspension unit;

the control system being configured to detect an unrequested suspension height change when the difference between the modelled height and the measured height of one or more suspension units exceeds a first threshold, wherein the suspension controller is selectively operable to control said suspension units in a self-levelling mode; and the control system is configured to inhibit said self-levelling mode when said unrequested suspension height change is detected for at least one, two, three, or four of said suspension units.

2. A control system as claimed in claim 1, wherein the control system is configured to inhibit said self-levelling mode for each suspension unit when the unrequested suspension height change is detected; or to inhibit said self-levelling mode only for the suspension unit(s) at which the unrequested suspension height change is detected.

3. A control system as claimed in claim 1, wherein the control system is configured to enable the self-levelling mode when the difference between the modelled height and the measured height decreases below a second threshold for at least one, two, three or four of said suspension units.

4. A control system as claimed in claim 1 configured to receive traction information for a driven wheel associated with one or more of said suspension units.

5. A control system as claimed in claim 3, wherein the suspension controller is configured to increase the height of one or more of said suspension units in response to a detected reduction in traction at the associated wheel in combination with the detection of an unrequested suspension height change in said suspension unit.

6. A control system as claimed in claim 1, wherein the first threshold is a predefined height difference.

7. A control system as claimed in claim 1, wherein the suspension modelling module is configured to model the height of each said suspension unit in dependence on data relating to one or more of the following: longitudinal vehicle acceleration; lateral vehicle acceleration; vertical vehicle acceleration; vehicle pitch; vehicle roll; vehicle speed; height measurement data for one or more of said suspension units; wheel drive torque(s); and wheel braking torque(s).

8. A control system as claimed in claim 1, wherein the control system is configured to calculate a first running average over a first time period of either the modelled height of each said suspension unit; or an offset between the modelled height and the measured height for each said suspension unit.

9. A control system as claimed in claim 8, wherein the control system is configured to said offset between the modelled height and the measured height for each said suspension unit, the first time period being longer than the second time period.

10. A control system as claimed in claim 9, wherein the control system is configured to calculate the difference between the modelled height and the measured height of said one or more suspension units based on the first and second running averages.

11. A control system as claimed in claim 9, wherein the control system stores the first running average of one or more of said suspension units as a reference value.

12. A control system as claimed in claim 11, wherein the control system stores the first running average at the time when the calculated difference becomes equal to or greater than the first threshold.

13. A control system as claimed in claim 11, wherein the control system is configured to detect a requested suspension height change when the calculated difference between the second running average and the stored reference value for at least one, two, three or four of said suspension units is less than a second threshold.

14. A control system for a motor vehicle suspension having a plurality of adjustable height suspension units, the control system comprising:
a suspension controller for controlling the suspension units;
a receiver for receiving a measured height signal for each suspension unit; and
a suspension modelling module for modelling the height of each suspension unit;
wherein the control system is configured to detect an unrequested suspension height change when the difference between the modelled height and the measured height of one or more suspension units exceeds a first threshold, the control system being configured to detect when a motor vehicle is wading, wherein:
said suspension controller comprises a suspension controller operable to control said plurality of adjustable height suspension units in a self-levelling mode; and
said first threshold comprises a wading detection threshold; and
a difference between the modelled height and the measured height of one or more suspension units exceeding a wading detection threshold being indicative of vehicle wading.

15. A control system for a motor vehicle suspension having a plurality of adjustable height suspension units, the control system comprising:
a suspension controller for controlling the suspension units;
a receiver for receiving a measured height signal for each suspension unit; and
a suspension modelling module for modelling the height of each suspension unit;
wherein the control system is configured to detect an unrequested suspension height change when the difference between the modelled height and the measured height of one or more suspension units exceeds a first threshold, the control system being configured for detecting a vehicle belly out event, the control system comprising:
said suspension controller comprises a suspension controller;
said receiver is further for receiving traction information for a driven wheel associated with each suspension unit; and
the control system being configured to detect an unrequested suspension height change indicative of a belly out event when said difference between the modelled height and the measured height of one or more suspension units exceeds a belly out detection threshold;
wherein, in dependence on the detection of said unrequested suspension height change at a suspension unit in combination with a detected reduction in traction at the driven wheel associated with that suspension unit, the suspension controller is configured to increase the height of said suspension unit.

16. A vehicle comprising:
a suspension having a plurality of adjustable height suspension units; and
a control system, the control system comprising:
a suspension controller for controlling the suspension units of the suspension;
a receiver for receiving a measured height signal for each suspension unit; and
a suspension modelling module for modelling the height of each suspension unit; wherein:

the control system is configured to detect an unrequested suspension height change when the difference between the modelled height and the measured height of one or more suspension units exceeds a first threshold, the suspension controller is selectively operable to control said suspension units in a self-levelling mode, and the control system is configured to inhibit said self-levelling mode when said unrequested suspension height change is detected for at least one, two, three, or four of said suspension units.

17. A method of controlling a motor vehicle suspension system, the method comprising:

detecting an unrequested suspension height change by:

measuring, by a height sensor, the height of a vehicle suspension unit;

modelling the height of said vehicle suspension unit;

calculating a difference between the modelled height and the measured height of said vehicle suspension unit; and identifying an unrequested suspension height change when the calculated difference exceeds a first threshold; and inhibiting a self-levelling mode when said unrequested suspension height change is detected for at least one, two, three, or four of said suspension units.

18. A control system as claimed in claim 14, wherein the control system is configured to inhibit said self-levelling mode when said unrequested suspension height change is detected for at least one, two, three, or four of said suspension units.

19. A control system as claimed in claim 18, wherein the control system is configured to inhibit said self-levelling mode for each suspension unit when the unrequested suspension height change is detected; or to inhibit said self-levelling mode only for the suspension unit(s) at which the unrequested suspension height change is detected.

20. A control system as claimed in claim 18, wherein the control system is configured to enable the self-levelling mode when the difference between the modelled height and the measured height decreases below a second threshold for at least one, two, three, or four of said suspension units.

21. A control system as claimed in claim 15, wherein the suspension controller is selectively operable to control said suspension units in a self-levelling mode; and the control system is configured to inhibit said self-levelling mode when said unrequested suspension height change is detected for at least one, two, three, or four of said suspension units.

* * * * *